(No Model.)

W. T. ARMSTRONG.
SEED SOWER ATTACHMENT.

No. 280,437. Patented July 3, 1883.

Witnesses:
Geo. H. Strong.
J. H. Rouse.

Inventor
Wm. T. Armstrong
By Dewey & Co.
Attorneys

UNITED STATES PATENT OFFICE.

WILLIAM T. ARMSTRONG, OF SOLEDAD, ASSIGNOR TO BAKER & HAMILTON, OF SAN FRANCISCO, CALIFORNIA.

SEED-SOWER ATTACHMENT.

SPECIFICATION forming part of Letters Patent No. 280,437, dated July 3, 1883.

Application filed December 5, 1882. (No model.)

*To all whom it may concern:*

Be it known that I, WILLIAM T. ARMSTRONG, of Soledad, in the county of Monterey, State of California, have invented an Improved Seed-Sower Attachment; and I hereby declare the following to be a full, clear, and exact description thereof.

My invention relates to an attachment for seed-sowers, and it is especially applicable to that class of implements in which the grain flows through an opening in the bottom of a containing-hopper, and is spread by a horizontally-rotating disk with distributing-arms.

It consists of one or more spirally-curved arms which are fixed to the top of a shaft which projects up through the opening in the bottom of the hopper, and these arms, by their peculiar shape and rotation, act to force the grain down in a regular current, which insures its being sown evenly upon the ground.

Figure 1:
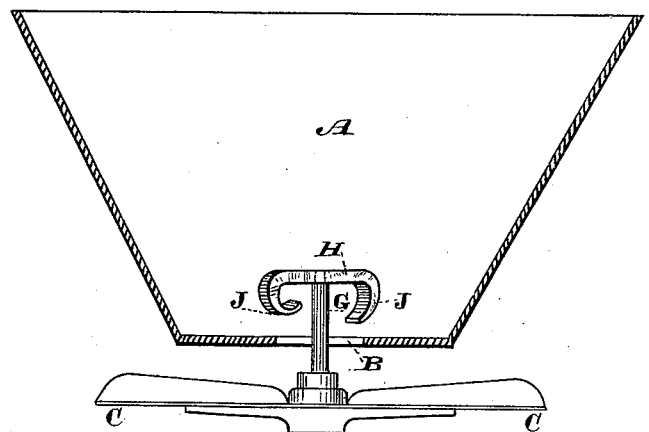
Figure 2:
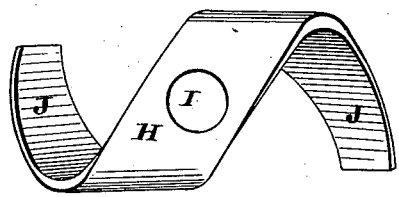
Figure 3:
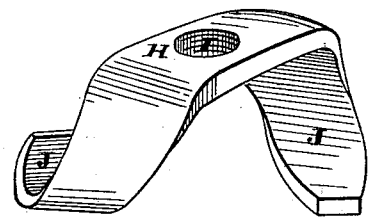
Figure 4:
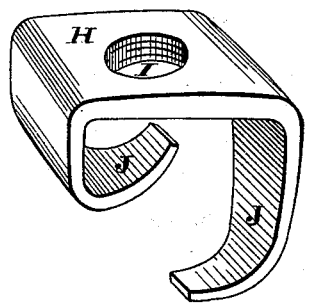
Figure 5:
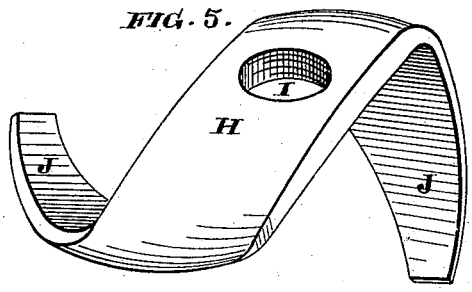

Referring to the accompanying drawings for a more complete explanation of my invention, Figure 1 is a view of a seed-sower with my attachment. Fig. 2 is a plan view of the attachment. Figs. 3, 4, 5 are perspective views of the device in different positions.

A is the hopper of a seed-sower, having a hole, B, through the bottom; and C is a distributing-disk mounted upon a vertical shaft immediately below the opening, being driven by a pinion, D, upon the lower end of its shaft, and a gear-wheel, E, which is fixed to a horizontal shaft, F, and engages the pinion, as shown, this construction being usual to this class of machines.

The shaft G passes up through the distributing-disk and the hole B, projecting a short distance into the hopper A, so that my attachment may be secured to its upper end and be driven with it. It consists of a flat horizontal portion, H, having a hole, I, made through it, so that the shaft G may screw into it or be secured by a nut or in other suitable manner.

The ends J of the device are turned downward, curving inward and to one side of a vertical plane, so as to form a partial screw or spiral, as shown in Figs. 3, 4, and 5.

This device is revolved with its shaft when the machine is in motion, and by its shape and screw-like motion tends to force the grain down with a regular even flow, so that the distributer is always equally supplied. No choking or clogging will occur, and the grain will be sown much more evenly than with the ordinary device.

Having thus described my invention, what I claim as new, and desire to secure by Letters Patent, is—

In a seed-sower, the hopper A, with the discharge-opening B in the bottom, and the distributing-disk C, adapted to rotate in a horizontal plane just below it, in combination with the flange H, with dependent teeth or arms J, having their ends turned inward and fixed to the vertical shaft G, so as to rotate within the hopper, as herein described.

In witness whereof I hereunto set my hand.

WILLIAM T. ARMSTRONG.

Witnesses:
L. H. MEADS,
EDW. W. DANIELS.